United States Patent [19]

Springolo et al.

[11] 4,228,499

[45] Oct. 14, 1980

[54] INTERFACE UNIT FOR DATA EXCHANGE BETWEEN A CENTRAL PROCESSOR AND A PERIPHERAL UNIT IN TDM TELECOMMUNICATION SYSTEM

[75] Inventors: Mario Springolo, Milan; Umberto Lorenzini, Cesano-Boscone, both of Italy

[73] Assignee: Societa Italiana Telecomunicazioni Siemens S.p.A., Milan, Italy

[21] Appl. No.: 846,452

[22] Filed: Oct. 28, 1977

[30] Foreign Application Priority Data

Oct. 29, 1976 [IT] Italy ............................ 28837 A/76

[51] Int. Cl.³ .................................................. G06F 3/00
[52] U.S. Cl. ..................................................... 364/200
[58] Field of Search ... 364/200 MS File, 900 MS File; 179/15 BA, 15 BV, 15 BW

[56] References Cited

U.S. PATENT DOCUMENTS

| | | | |
|---|---|---|---|
| 3,312,950 | 4/1967 | Hillman et al. | 364/200 |
| 3,662,349 | 5/1972 | Bartlett et al. | 364/200 |
| 3,833,888 | 9/1974 | Stafford et al. | 364/200 |

FOREIGN PATENT DOCUMENTS 2404887  8/1974  Fed. Rep. of Germany.

Primary Examiner—Raulfe B. Zache
Attorney, Agent, or Firm—Karl F. Ross

[57] ABSTRACT

A central processor of a telecommunication system, operating in a time-division mode, communicates with a peripheral unit through an interface unit including a receiving section and a transmitting section. A control component in the receiving section commands the writing of a signalization messages from the processor in a random-access memory, in cells addressed by counting signals from the peripheral unit in respective time slots of a scanning cycle. The stored signalization messages are read out, in the first half of a time slot immediately preceding the one in which they are to be utilized in the peripheral unit, for relaying to that unit; the second half of each time slot serves for the writing of new messages in the memory or for the deletion of previously stored messages in response to cancellation signals from the peripheral unit, all with the aid of instructions extracted from a microprogram store in the control component of the receiving section. A similar control component in the transmitting section handles the forwarding of return messages from the peripheral unit to the processor. Supervisory messages from the processor are routed from the receiving section to the transmitting section for retransmission of responses to the processor.

10 Claims, 5 Drawing Figures

INTERFACE UNIT FOR DATA EXCHANGE BETWEEN A CENTRAL PROCESSOR AND A PERIPHERAL UNIT IN TDM TELECOMMUNICATION SYSTEM

FIELD OF THE INVENTION

Our present invention relates to a telecommunication system of the time-division-multiplex (TDM) type and, more particularly, to an interface unit designed to facilitate the exchange of data in real time between a central processor and a peripheral unit in such a system.

BACKGROUND OF THE INVENTION

A centralized processor dialoguing with one or more peripheral units is utilized, for example, in monitoring the progress of a number of telephone calls over connections established by a central office between calling and called subscribers. The data exchange in real time between the processor and any peripheral unit, however, is not without problems in view of the fact that the processor and the associated peripheral units generally differ as to operating modes and timing. Thus, the rate of data emission by the processor usually does not coincide with the rhythm in which a given peripheral unit scans the time slots assigned to it in a recurrent cycle or frame. Moreover, responses from the peripheral unit can be conveyed to the processor only when the latter is in condition to receive them.

OBJECTS OF THE INVENTION

The general object of our present invention, therefore, is to provide an interface unit facilitating such data exchange by simple and economical means.

A more particular object of our invention is to provide means in such a unit for discriminating among different types of messages emitted by the processor, such as signalization messages intended for a specific peripheral unit and supervisory messages serving, for example, to test the performance of the interface unit itself.

SUMMARY OF THE INVENTION

An interface unit according to our invention, inserted between a central processor and a peripheral unit serving for the selective activation of a multiplicity of loads (e.g. call monitors) in a recurrent scanning cycle, is divided into a receiving section and a transmitting section. The receiving section has input and output means respectively connected to the processor and to the associated peripheral unit whereas the transmitting section has input and output means respectively connected to the peripheral unit and to the processor. The receiving section further includes first register means, advantageously of the series/parallel type, for the temporary storage of incoming messages from the processor, memory means having a multiplicity of cells respectively allocated to the several loads activable by the associated peripheral unit, and a first control component or subunit responsive to a signal from the first register means for directing the writing by an operative code of an incoming message, destined for one of these loads as identified by an accompanying address code, in the allocated cell of the memory means during one part of a time slot (preferably its second half) and for commanding the readout, during another part of a time slot (preferably its first half), of the contents of the cell which is allocated to the load activable in the immediately following time slot. The transmitting section further includes second register means, advantageously of the parallel/series type, for the temporary storage of messages from the peripheral unit, as well as a second control component or subunit responsive to a signal from the last-mentioned register means for routing such return messages to the processor.

According to a more particular feature of our invention, each of the two control components includes instruction means such as a microprogram store for routing supervisory messages, bearing no address code in contrast to signalization messages, from the receiving section to the transmitting section and for retransmitting responses thereto from the latter section to the processor. The microprogram store of the first control component may be provided with timer-actuated switchover means, including a multiplexer, for extracting therefrom an invariable reading instruction during the part of the time slot allotted to readout. During the writing part of the time slot, the switchover means may extract from this microprogram store a message-deleting instruction in response to a cancellation message from the peripheral unit.

Our invention also makes it possible, with the aid of a buffer register in the receiving section of the interface unit, to send universal messages to all the loads of the associated peripheral unit without intervention of the aforementioned memory means. Such a universal message could be, for example, a time signal destined for all the telephone connections monitored by the peripheral unit.

BRIEF DESCRIPTION OF THE DRAWING

The above and other features of our invention will now be described in detail with reference to the accompanying drawing in which.

SPECIFIC DESCRIPTION

Figure 1:
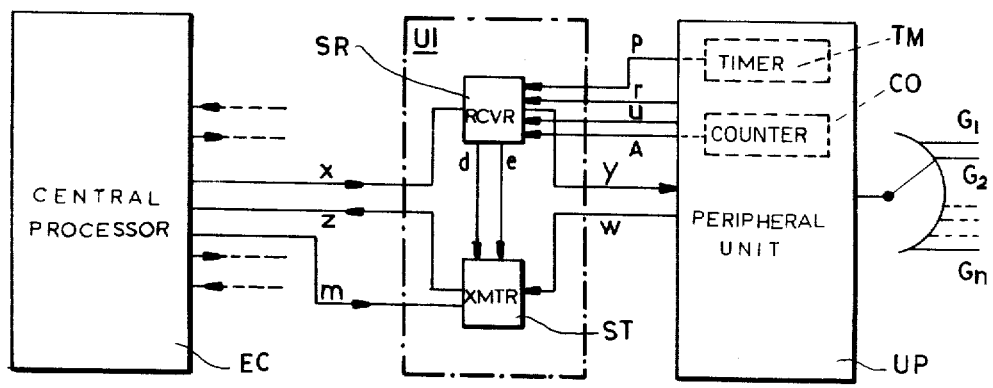
FIG. 1 is an overall block diagram of part of a telephone system including an interface unit according to our invention.

In FIG. 1 we have schematically illustrated a central processor EC dialoguing with a number of peripheral units UP (only one shown) by way of respective interface units UI according to our invention. Peripheral unit UP selectively activates, in different time slots of a scanning cycle, a plurality of loads $G_1, G_2, \ldots G_n$ which in this specific instance are assumed to be telephone connections over which calls are to be initiated, monitored and terminated; thus, unit UP exchanges signals with any of these connections when instructed to do so by the processor. The scanning cycle for loads $G_1-G_n$ is established by a timer TM stepping a counter CO which periodically sets up the temporary connections to the several loads.

Interface unit UI is divided into a receiving section SR and a transmitting section ST. Section SR has a data input connected to processor EV via a lead x and an output working into unit UP by way of a multiple y. Section ST has a data input receiving messages from unit UP via a multiple w and has an output for the retransmission of such messages to the processor by way of a lead z. Also shown in FIG. 1 is a lead m extending from processor EC to section ST, for the purpose of indicating to unit UI the readiness of the processor to receive messages, as well as connections d and e extending from section SR to section ST. Other leads p, r, u and A carry signals from unit UP to section SR as more fully described hereinafter.

Figure 2:
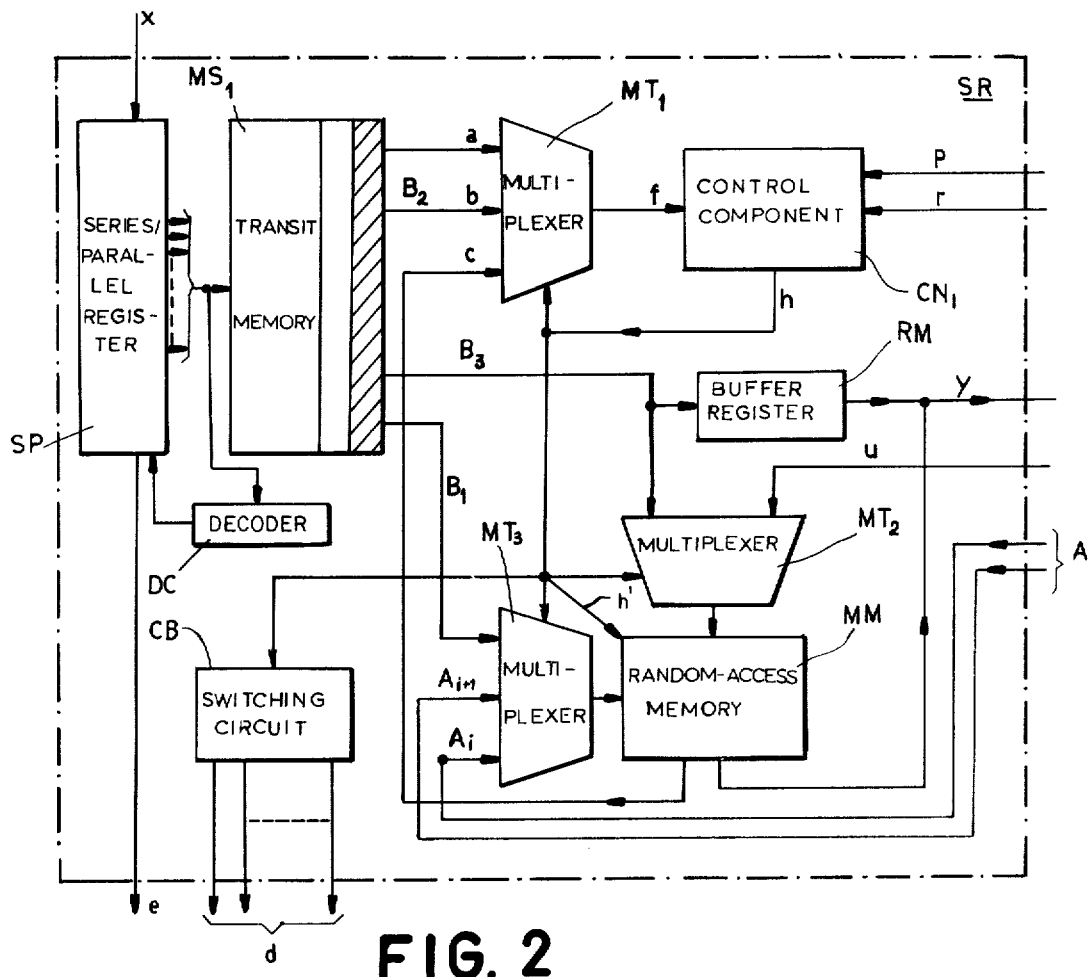
FIG. 2 is a more detailed diagram of a receiving section of the interface unit shown in FIG. 1.
Figure 5:
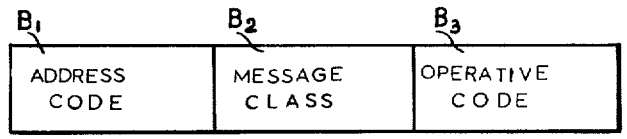
FIG. 5 is a diagram illustrating the composition of a signalization message to be handled by the interface unit according to our invention.

In FIG. 2 we have shown details of receiving section SR. Data bits arriving from processor EC (FIG. 1) via lead x are serially fed into a series/parallel register SP with parallel output connections extending to respective stages of a transit memory $MS_1$; in cases where the processor has its own facilities for temporarily storing outgoing messages until they can be utilized by interface unit UI, memory $MS_1$ can be omitted. The presence of a message in memory $MS_1$ results in the energization of a lead a which terminates at an input of a multiplexer $MT_1$. Another input b of that multiplexer carries a classification code or label $B_2$ identifying the stored message as one of several types, e.g. a signalization message to be forwarded to peripheral unit UP for activation of a specific load thereof, a supervisory or service message eliciting a response from unit UI itself (e.g. a command "send parity-violation message"), or a universal message destined for all the loads $G_1-G_n$. A signalization message, as represented schematically in FIG. 5, further includes an address code $B_1$ and an operative code $B_3$. Address code $B_1$ identifies the particular load $G_1-G_n$ (FIG. 1) for which the message is intended. Address code $B_1$ and operative code $B_3$ go to inputs of respective multiplexers $MT_3$ and $MT_2$, code $B_3$ being also fed to a buffer register RM designed to receive the above-discussed universal messages.

A control component or subunit $CN_1$ has an input connection f from multiplexer $MT_1$ and also receives signals from peripheral unit UP via leads p and r. An output multiple h of component $CN_1$ has branches extending to control inputs of the several multiplexers $MT_1-MT_3$; another such branch terminates at a switching circuit CB, consisting of a group of flip-flops with individual output leads included in multiple d, while a further branch h' carries read/write signals to a random-access memory MM. The latter memory has n cells respectively allocated to loads $G_1-G_n$ of peripheral unit UP; the contents of any of these cells can be read out to unit UP by way of multiple y. A lead c extending from memory MM to a further input of multiplexer $MT_1$ indicates the loaded or empty state of a cell identified by an address from multiplexer $MT_3$. Buffer register RM, bypassing the memory MM, works into the same output multiple y.

Connection A comprises two leads, labeled $A_i$ and $A_{i+1}$, originating at counter CO (FIG. 1) and terminating at respective inputs of multiplexer $TM_3$. Lead $A_i$ carries the address of a load $G_i$ scanned during a given time slot; lead $A_{i+1}$ carries the address of the load $G_{i+1}$ to be scanned in the immediately following time slot. Lead u, carrying a message-deletion signal in any time slot in which the contents of the corresponding memory cell are to be erased after the corresponding message has been received and implemented by peripheral unit UP, terminates at a second input of multiplexer $MT_2$; component $CN_1$ switches multiplexer $MT_2$ to its alternate input u in response to a cancellation signal appearing on the lead r.

Lead e, extending to transmitting section ST, originates at a series output of register SP and serves to relay the incoming data bits directly to section ST for retransmission to the processor in response to a particular code configuration detected by a decoder DC.

Figure 3:
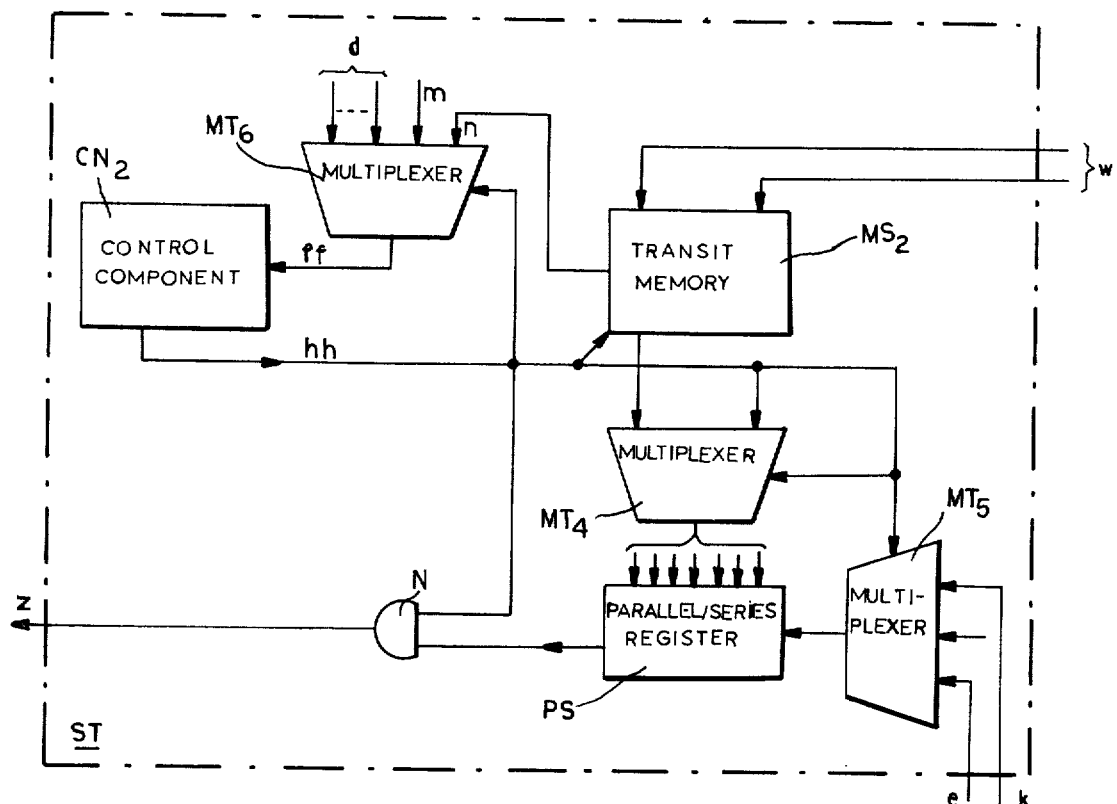
FIG. 3 is a more detailed diagram of a transmitting section of the interface unit shown in FIG. 1.

As shown in FIG. 3, transmitting section ST comprises a transit memory $MS_2$ receiving the bits of return messages from unit UP arriving over multiple w. Memory $MS_2$ works through a multiplexer $MT_4$ into a set of parallel inputs of a parallel/series register PS also having a series input energizable by the output of a multiplexer $MT_5$. Multiplexer $MT_5$ has an input connected to lead e, coming from receiving section SR, and another input connected to a lead k originating at a nonillustrated malfunction detector which monitors the performance of unit UI itself.

A further multiplexer $MT_6$ receives on one input, via a lead n, a signal indicating the presence of a message in transit memory $MS_2$. Another input of this multiplexer is connected to multiple d whose individual leads are selectively energizable by the flip-flops of circuit CB (FIG. 2). Multiplexer $MT_6$ also has an input connected to lead m which carries the readiness signal from processor EC.

An output line ff extends from multiplexer $MT_6$ to a control component or subunit $CN_2$ which has an output multiple hh with branches terminating at control inputs of multiplexers $MT_4-MT_6$, at a discharge input of memory $MS_2$, at an alternate input of multiplexer $MT_4$ and at an input of an AND gate N whose other input receives the bits serially read out from register PS. Gate N has its output connected via lead z to processor EC.

Figure 4:
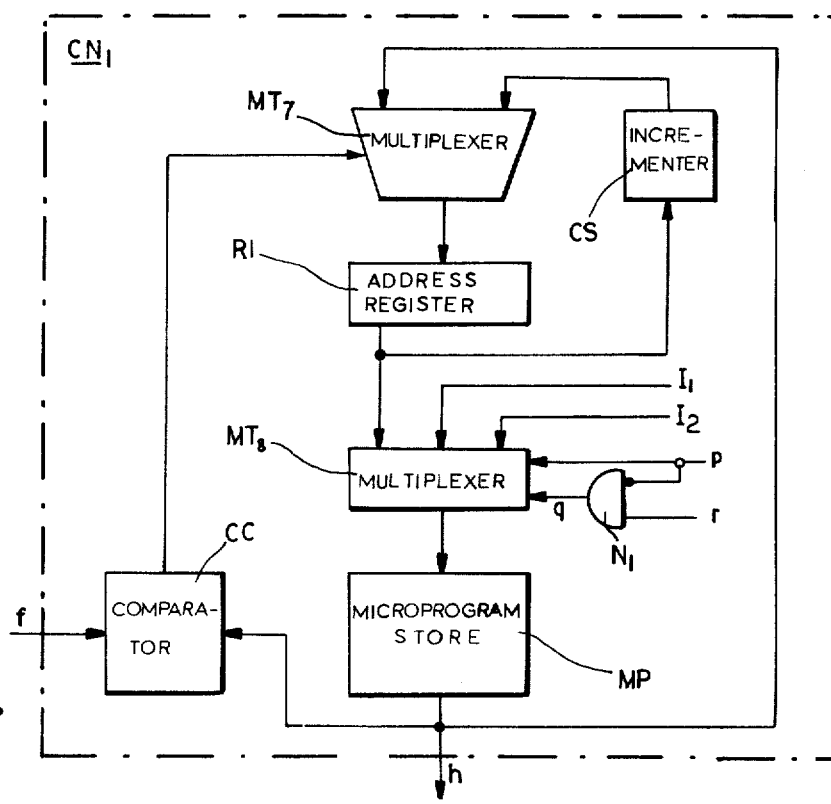
FIG. 4 shows details of a control component forming part of the receiving section of FIG. 2.

Control component $CN_1$, as more fully illustrated in FIG. 4, comprises a microprogram store MP in the form of a read-only memory containing a set of microinstructions. These instructions are read out under the control of an address register RI which is loaded through a multiplexer $MT_7$ and works into an input of a multiplexer $MT_8$ in parallel with an incrementer CS. Microprogram store MP, whose output is the multiple h, delivers these instructions on the one hand to an input of a comparator CC and on the other hand to an input of multiplexer $MT_7$ whose other input is fed by incrementer CS. Comparator CC has a second input tied to output multiple f of multiplexer $MT_1$ (FIG. 2) and, upon detecting a match between a word appearing on multiple f and an instruction read out from store MP, switches the multiplexer $MT_7$ to multiple h to command a jump to a new address identified by a part of the instruction currently read out. In the absence of such a match, multiplexer $MT_7$ receives the previous address from register RI by way of incrementer CS in which the numerical value of that address has been increased by 1 to advance the microprogram by one step.

The aforementioned operations take place in the second half of a time slot under the control of timer TM (FIG. 1) which energizes the lead p in the first half of each time slot. Such energization shifts the multiplexer $MT_8$ to another input carrying a fixed instruction address $I_1$ which results in the emission of a reading signal on branch h' (FIG. 2); this causes the readout of the contents of a cell of memory MM whose address appears concurrently on lead $A_{i+1}$, i.e. the operative code of a signalization message relating to load $G_{i+1}$. Lead p also extends to an inverting input of an AND gate $N_1$ whose other input is tied to lead r. In the first half of a time slot, therefore, the presence of a cancellation signal on lead r energizes an output lead q of gate $N_1$ which switches the multiplexer $MT_8$ onto a third input carrying a fixed instruction address $I_2$; the instruction thereupon read out from store MP switches the multiplexer $MT_2$ (FIG. 2) to its alternate input whereby a message-deletion signal on lead u reaches the memory cell concurrently identified by the address appearing on lead $A_i$, thus canceling the stored message relating to load $G_i$.

Control component $CN_2$ of section ST (FIG. 3) is essentially similar to component $CN_1$ shown in FIG. 4, except for the omission of multiplexer $MT_8$ and gate $N_1$; thus, the register RI of component $CN_2$ works directly into store MP in parallel with incrementer CS.

At the start of a microprogram, an instruction read out from store MP switches the multiplexer $MT_1$ (FIG. 2) to its input a while setting up a reference voltage in the right-hand input of comparator CC. In the presence of a message in memory $MS_1$, input a is energized and the comparator switches the multiplexer $MT_7$ (FIG. 4) to its left-hand input whereupon the register RI receives a new address. The latter causes the readout of an instruction of a first classification code to comparator CC which compares it with code $B_2$ appearing on multiple f, the multiplexer $MT_1$ having meanwhile been switched to its input b by another part of the microinstruction read out from store MP. If no match is found, multiplexer $MT_7$ stands on its right-hand input and the microprogram is advanced by one step, with feeding of another classification code to the comparator. As soon as the class of the message has been identified, multiplexer $MT_7$ is again switched to initiate the routing of the message present in memory $MS_1$ to memory MM in the case of a signalization message or to buffer register RM in the case of a universal message. If the message is of the supervisory or service type, the code configuration on output multiple h sets one or more of the flip-flops in circuit CB to energize a corresponding combination of leads d, depending on the specific message involved.

The presence of a signalization message calls for a jump in the microprogram to an instruction which switches the multiplexer $MT_1$ onto its input c to determine the loaded or empty state of the corresponding cell of memory MM. If comparator CC detects that the cell is free, branch h' directs the writing of the message in that cell with the aid of multiplexers $MT_2$ and $MT_3$. If the cell happens to be occupied, the microprogram is stepped and a similar cycle is started.

As already explained, the aforedescribed operations take place only in the second halves of time slots established by the timer TM of peripheral unit UP when neither of leads p and q is energized. In the first half of any time slot, the microprogram is interrupted for the reading of the cell of memory MM identified by the current address on lead $A_{i+1}$, e.g. the cell allocated to load $G_{15}$ during time slot No. 14. If a cancellation signal energizes the lead r and thus also the lead q in the second half of a time slot, the microprogram is also interrupted while the message previously stored in the cell identified by the address on lead $A_i$ (thus, the cell allocated to load $G_{14}$ in the assumed instance) is deleted. During any such interruption, the address last read into register RI is preserved for readout upon the resumption of the microprogram.

The microprogram of control component $CN_2$ (FIG. 3) initially switches the multiplexer $MT_5$ (which may normally be in a middle position) to its input e and then to its input k while unblocking the AND gate N to allow the sending of a recycle message and an alarm message, if any, to processor EC by way of lead z. Next, it sets the multiplexer $MT_6$ on its input n to determine the presence of a return message in memory $MS_2$. If this is the case, multiplexer $MT_6$ is switched to lead m to determine the state of readiness of the processor; if the answer is positive, as revealed by the comparator within subunit $CN_2$, the contents of memory $MS_2$ are read out via multiplexer $MT_4$ into register PS and thence by way of AND gate N to the processor via lead z.

By shifting multiplexer $MT_6$ to its extreme left-hand input and multiplexer $MT_4$ to its right-hand input, subunit $CN_2$ transmits to register PS any code configuration of a supervisory message represented by the energization pattern, if any, of leads d. Again, transmission of the message to the processor is facilitated by the unblocking of gate N through a signal on a lead of multiple hh.

We claim:
1. In a TDM telecommunication system wherein a central processor dialogues with a plurality of peripheral units each having a multiplicity of loads activable in time slots individually assigned thereto in a recurrent scanning cycle, the combination therewith of an interface unit interposed between said processor and an associated peripheral unit, said interface unit comprising:
a receiving section with first input means connected to said processor and first output means connected to the associated peripheral unit;
a transmitting section with second input means connected to the associated peripheral unit and second output means connected to said processor;
a series/parallel register in said receiving section having a series input connected to said first input means for the temporary storage of incoming messages from said processor;
a parallel/series register in said transmitting section with parallel inputs connected to said second input means for the temporary storage of return messages from the associated peripheral unit;
memory means in said receiving section having a multiplicity of cells connected to said first output means, said cells being respectively allocated to said loads and identified by address codes corresponding to the time slots assigned thereto;
timer-operated first control means in said receiving section responsive to a signal from said series/parallel register for directing the writing of an operative code of an incoming message, destined for a load of the associated peripheral unit identified by an accompanying address code, in the allocated cell of said memory means during one part of a time slot and for commanding the readout to said first output means, during another part of a time slot, of the contents of the cell allocated to the load which is activable in the immediately following time slot; and
second control means in said transmitting section responsive to a signal from said parallel/series register for routing return messages from the associated peripheral unit to said second output means.

2. The combination defined in claim 1 wherein said series/parallel register includes decoding means for detecting a recycle message to be serially relayed to said parallel/series register for retransmission to said processor.

3. The combination defined in claim 1 wherein the incoming messages include signalization messages and supervisory messages distinguished by different digital labels, only said signalization messages bearing an address code identifying a cell in said memory means, said first control means including first instruction means for routing said supervisory messages from said receiving section to said transmitting section, said second control means including second instruction means for retransmitting responses to said supervisory messages to said processor by way of said second output means.

4. In a TDM telecommunication system wherein a central processor dialogues with a plurality of peripheral units each having a multiplicity of loads activable in time slots individually assigned thereto in a recurrent scanning cycle, the combination therewith of an interface unit interposed between said processor and an associated peripheral unit, said interface unit comprising:

a receiving section with first input means connected to said processor and first output means connected to the associated peripheral unit;

a transmitting section with second input means connected to the associated peripheral unit and second output means connected to said processor;

first register means in said receiving section connected to said first input means for the temporary storage of incoming messages from said processor, said incoming messages including signalization messages and supervisory messages distinguished by different digital labels;

second register means in said transmitting section connected to said second input means for the temporary storage of return messages from the associated peripheral unit;

memory means in said receiving section having a multiplicity of cells connected to said first output means, said cells being respectively allocated to said loads and identified by address codes of said signalization messages corresponding to the time slots assigned thereto;

timer-operated first control means in said receiving section responsive to a signal from said first register means for directing the writing of an operative code of an incoming message, destined for a load of the associated peripheral unit identified by an accompanying address code, in the allocated cell of said memory means during one part of a time slot and for commanding the readout to said first output means, during another part of a time slot, of the contents of the cell allocated to the load which is activable in the immediately following time slot, said first control means including first instruction means for routing said supervisory messages from said receiving section to said transmitting section; and second control means in said transmitting section responsive to a signal from said second register means for routing return messages from the associated peripheral unit to said second output means, said second control means including second instruction means for retransmitting responses to said supervisory messages from said interface unit to said processor by way of said second output means.

5. The combination defined in claim 4 wherein said instruction means are microprogram stores.

6. The combination defined in claim 5 wherein said first control means further includes a source of microprogram addresses provided with timer-actuated switchover means for extracting from the microprogram store thereof an invariable reading instruction in said other part of a time slot.

7. The combination defined in claim 6 wherein said switchover means is responsive to a cancellation message from the associated peripheral unit for extracting from the microprogram store thereof a message-deleting instruction in said one part of a time slot.

8. The combination defined in claim 6 wherein said source of microprogram addresses comprises a comparator with input connections to an output of said first register means and to an output of the microprogram store of said first control means, an address register, a feedback line extending from the last-mentioned output, an incrementer connected to an output of said address register, and a multiplexer controlled by said comparator for alternatively connecting said feedback line and said incrementer to an input of said address register.

9. The combination defined in claim 8 wherein said switchover means is inserted between said address register and the microprogram store of said first control means.

10. The combination defined in claim 4 wherein said incoming messages further include universal messages intended for all said loads, said receiving section further comprising a buffer register inserted between said first register means and said first output means in parallel with said memory means for routing an incoming universal message directly to the associated peripheral unit.

* * * * *